United States Patent [19]

Mundkur

[11] Patent Number: 5,305,436
[45] Date of Patent: Apr. 19, 1994

[54] HOSE BUS VIDEO INTERFACE IN PERSONAL COMPUTERS

[75] Inventor: Kiran Mundkur, Los Altos, Calif.

[73] Assignee: Hewlett-Packard Company, Palo Alto, Calif.

[21] Appl. No.: 502,821

[22] Filed: Apr. 2, 1990

[51] Int. Cl.[5] .............................................. G06F 15/62
[52] U.S. Cl. .................................................... 395/162
[58] Field of Search ................................ 395/162–166, 395/153, 154, 725, 325; 364/DIG. 1, DIG. 2

[56] References Cited

U.S. PATENT DOCUMENTS

| | | | |
|---|---|---|---|
| 4,578,773 | 3/1986 | Desai et al. | 364/DIG. 2 |
| 4,727,480 | 2/1988 | Albright et al. | 395/725 |
| 4,782,462 | 11/1988 | Kaplinsky et al. | 364/900 |
| 4,811,007 | 3/1989 | Schreiber | 340/747 |
| 4,829,370 | 5/1989 | Mayne et al. | 358/78 |
| 4,878,181 | 10/1989 | MacKenna et al. | 364/518 |
| 5,001,652 | 3/1991 | Thompson | 395/164 |
| 5,038,301 | 8/1991 | Thoma, III | 395/153 |
| 5,040,111 | 8/1991 | Al-Salameth et al. | 395/325 |
| 5,056,041 | 10/1991 | Guttag et al. | 395/164 |
| 5,109,490 | 4/1992 | Arimilli et al. | 395/325 |
| 5,125,080 | 1/1992 | Pleva et al. | 395/325 |

*Primary Examiner*—Gary V. Harkcom
*Assistant Examiner*—Almis Jankus

[57] ABSTRACT

A system and method for interfacing a video subsystem capable of driving a video display monitor to a personal computer (PC) architecture. The system and method involves connecting the video subsystem to a host bus via a host bus video interface. The host bus communicates directly to a central processing unit (CPU) and to a slower system bus through buffers. The central processing unit as well as a system bus master connected to the system bus can communicate at high speeds to the video subsystem. The host bus video interface includes a fast temporary storage buffer so that the CPU or the system bus master, during a write cycle to the video subsystem, can write data at high speed to the video subsystem. The video subsystem may further include SRAM in its video memory to increase performance.

4 Claims, 9 Drawing Sheets

VIDEO SUBSYSTEM INTERFACE IN A PERSONAL COMPUTER ARCHITECTURE OF THE PRESENT INVENTION

HOSE BUS VIDEO INTERFACE IN PERSONAL COMPUTERS

BACKGROUND OF THE INVENTION

I. Field of the Invention

The present invention relates to computer architecture, and more particularly, to a personal computer architecture having a high performance video subsystem.

II. Related Art

In conventional personal computer (PC) architectures, the central processing unit (CPU), main memory, and other peripheral input/output (I/O) devices, such as keyboards, printers, disk drives, and video subsystems, are commonly interfaced by way of a bus network having a host bus and a system bus. The system bus connects to the host bus via buffers and is generally slower than the host bus. The dual bus network is implemented partially because it was realized early on that most of a PC's time is utilized during computation or during the movement of data between the CPU and the main memory. Consequently, the CPU and the main memory are situated on the faster host bus, while the video subsystem as well as other peripheral I/O devices with varying clock speeds are usually connected to the slower system bus. In this configuration, the main memory is sometimes called the "host" memory because it connects to the architecture via the host bus.

The rationale for interfacing the video subsystem to the system bus is that the video subsystem in the PC industry has been historically considered a noncritical computer subsystem as far as performance is concerned. Performance in this context refers to the speed at which a video display can be updated. More specifically, performance is related to the operational bandwidth that is available to the central processing unit when communicating with the video subsystem.

The rationale for considering the video subsystem a noncritical computer subsystem was originally well founded. Initially, video subsystems drove very low resolution displays in the PC industry and, therefore, did not need to handle high speed block transfers of data. Furthermore, customers were using video displays primarily for very low end graphics applications. Hence, performance was just not a major issue.

As a consequence of the rapidly evolving PC industry, high end PCs have migrated into workstation applications, such as high performance Computer Automated Design (CAD) and engineering workstations, where speed is an extremely critical factor. A demand exists in the marketplace for video subsystems which can drive higher resolution displays with more colors and with three-dimensional capabilities. Video subsystems are being developed to far surpass the performance of previous designs. As originally defined by IBM, a video graphics array (VGA) had 16 colors with a picture element (pixel) resolution of 640 by 480. The new Super VGA standard increases the previous video standard resolution to 1024 by 768 pixels, requiring a very high speed video subsystem.

The usual connection of the video subsystem to the system bus along with other peripheral I/O devices, does not adequately meet the high data block transfer rates needed for the high performance video subsystems. When a peripheral device like a video subsystem wishes to perform a transaction on the system bus, the system bus usually has only a few time slots available, or cycle times, partially because of arbitration protocols. When the video subsystem attempts to retrieve data from the system bus, the access time is lengthened by wait states.

Until the present invention, no PC architecture in the marketplace or elsewhere has interfaced the video subsystem to a high speed, 32-bit or 16-bit host bus in order to achieve high speed data transfers to the video subsystem. In this regard, see N. Baran, "EISA Arrives," *Byte Magazine*, v. 14, number 12, November 1989 (cover story), which is incorporated herein by reference.

SUMMARY OF THE INVENTION

Representing an intense effort on the part of several PC designers and engineers over a span of many months, the present invention overcomes the previously mentioned problems and deficiencies in the prior art related to providing extremely fast data transfers from a PC architecture to a video subsystem.

One embodiment of the present invention is a system for a PC architecture comprising a central processing unit, such as an Intel 80286, 80386, 80386D, 80386SX, 80486, or any other compatible microprocessor. The microprocessor is connected to a host bus. A video subsystem for driving a video monitor has a video controller and a video memory. A host bus video interface connects the video subsystem to the host bus. Conventional personal computer architectures interface the video subsystem to a system bus which is slower than the host bus and which is connected to the host bus through buffers. Because the video subsystem can communicate directly to the host bus, rather than the slower system bus, the video subsystem can be operated at higher speeds relative to conventional architectures.

In another embodiment of the present invention, a system bus master is connected to a system bus of a PC architecture, while a CPU is connected to a host bus. A video subsystem can communicate with both the system bus master and the CPU. The CPU communicates to the video subsystem via the address, data, and control lines of the host bus. The system bus master communicates to the video subsystem via the data and address lines of the host bus and the control lines of the system bus. As a result of the novel configuration, the system bus master as well as the CPU can communicate to the video subsystem faster than in conventional architectures.

Another embodiment of the present invention incorporates a fast first-in first-out (FIFO) video latch, also known as a video posted write latch, in a host bus video interface. The host bus video interface connects a video subsystem to a host bus, where the CPU resides. The video posted write latch is a very fast temporary storage buffer. It can retrieve data from the CPU sooner than the video subsystem itself. When the CPU writes at high speed to the video subsystem, it writes the data into the video posted write latch of the host bus video interface in a relatively short time. The data is then transferred from the video posted write latch to a video controller within the video subsystem at the rate at which the video controller can read the data. Accordingly, the CPU is freed of the burden of having to wait until the data transfer is completed. The video posted write latch provides for zero wait state access to the host bus during single write accesses, which has not been accomplished in conventional designs.

Yet another embodiment of the present invention is a video memory interface for static random access memory (SRAM) within the video subsystem. The video memory interface can use either conventional dynamic random access memory (DRAM) or video random access memory (VRAM). However, the video memory interface is also adapted to use SRAMS. SRAMs are fast and do not have the performance penalties of row or column address pre-charge in the case of DRAMs or a refresh requirement in the case of VRAMs and DRAMS. Consequently, higher performance is achieved.

Still another embodiment of the present invention is a method for a personal computer architecture. The method involves an architecture having a video subsystem in communication with a CPU. The CPU communicates to the video subsystem via a host bus. The method includes the steps of retrieving host addresses, host data, and host control signals from the host bus; latching the host data into a video posted write latch; translating the host addresses, the host data, and the host control signals into, respectively, translated addresses, translated data, and translated control signals; transmitting these translated signals to a video controller; and driving a video display monitor with the video controller. The method allows for high speed communication between the CPU and the video subsystem.

Yet another embodiment of the present invention is another method for a PC architecture. This method involves an architecture having a video subsystem in communication with a CPU and a system bus master. The CPU communicates to the video subsystem via a host bus. The system bus master communicates to the video subsystem via the data and address lines of the host bus and the control lines of a system bus. The method is for high speed data transfer from the system bus master to the video subsystem.

The method includes the steps of retrieving host addresses and host data from the host bus, and system control signals from the system bus; latching the host data into a video posted write latch; translating the host addresses, the host data, and the system control signals into, respectively, translated addresses, translated data, and translated control signals; transmitting these translated signals to a video controller; and driving a video display monitor with the video controller. The method allows for high speed communication between the system bus master and the video subsystem, while permitting high speed communication between the CPU and the video subsystem.

Further objects and advantages of the present invention will become apparent to one skilled in the art upon examination of the following drawings and detailed description. It is intended that any additional objects and advantages be incorporated herein.

BRIEF DESCRIPTION OF THE DRAWINGS

The present invention as defined in the claims can be better understood with reference to the text and to the following drawings:

DETAILED DESCRIPTION OF THE PREFERRED EMBODIMENT

I. Architectural Description

A. Conventional Architecture

Figure 1:
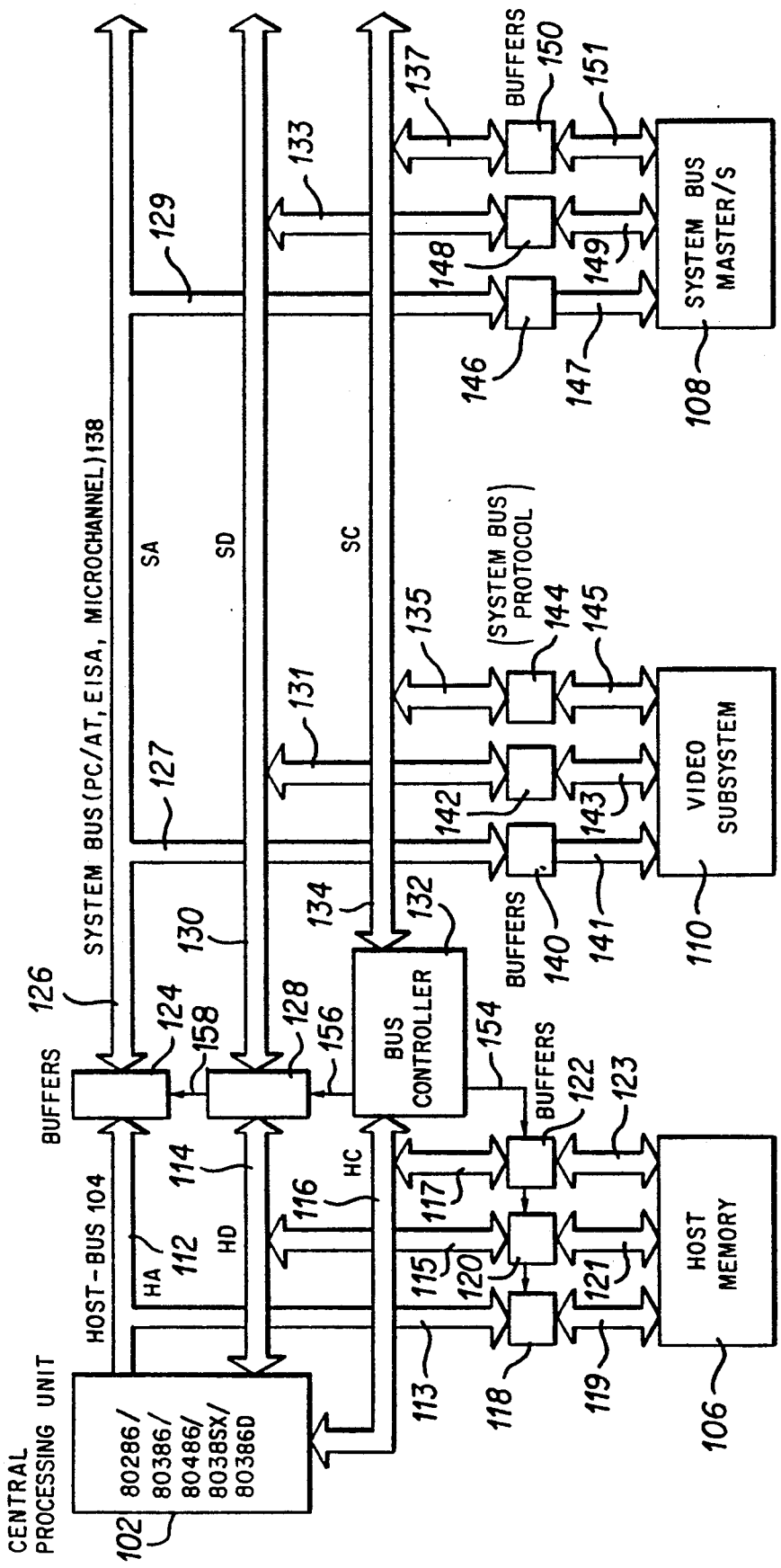
FIG. 1 is a high level block diagram of an example (case 1) of a conventional architecture for a personal computer (PC) system.

FIG. 1 illustrates a high level block diagram of a conventional architecture for a personal computer (PC) system. A central processing unit (CPU) 102 is of the Intel family of PC-compatible microprocessors, including the Intel 80286, 80386, 80386D, 80386SX, 80486, and any other future additions to the family. The CPU 102 has a host bus 104 for communication with various PC subsystems. The PC subsystems could include, for example, a host (main) memory 106, a system bus master device 108, and/or a video subsystem 110. Moreover, the host bus 104 is buffered to form a slower system bus 138 as is discussed in more detail below.

The host bus 104 comprises host address (HA) bus 112, host data (HD) bus 114, and host control/status (HC) bus 116. The HA bus 112 of the host bus 104 is buffered and latched in buffer 124 to thereby create a system address (SA) bus 126. The HD bus 114 is buffered and latched in buffer 128 to thereby create a system data (SD) bus 130. A bus controller 132 connects the HC bus 116 to a system control (SC) bus 134. The bus controller 132 converts the host bus control/status signals into system bus control/status signals. The bus controller 132 further controls the buffers 124 and 128.

Via the host bus 104, the CPU 102 interacts with the host memory 106 through buffers 118, 120, and 122 which have the ability to latch data. The bus controller 132 controls the buffers 118, 120, and 122.

In the conventional PC architecture of FIG. 1, the video subsystem 110 is interfaced to the system bus 138 via buffers 140, 142, and 144. The buffers 140, 142 and 144 implement a system bus protocol. The system bus protocol dictates the manner in which data is transferred between the CPU 102 and the video subsystem 110. Because the system bus 138 is designed for handling slower data transfers than the host bus 104, the system bus protocol is slower than the host bus protocol.

Communication also takes place between the bus master 108 and the video subsystem 110. This communication must also follow the system bus protocol via buffers 146, 148 and 150.

With regard to the speed of the architecture of FIG. 1, a bottleneck exists between the CPU 102 and the video subsystem 110. The CPU 102 is capable of handling fast data transfers to the video subsystem 110, but is slowed down due to the system bus protocol implemented by buffers 124 and 128. As the clock frequency of the CPU 102 is increased, the loss of performance with regard to communication with the video subsystem 110 becomes significant.

A second bottleneck exists between the system bus master 108 and the video subsystem 110. In order to communicate to the video subsystem 110, a system bus master 108 operating at high speed must be slowed down to meet the system bus protocol, which is relatively slower.

Figure 2:
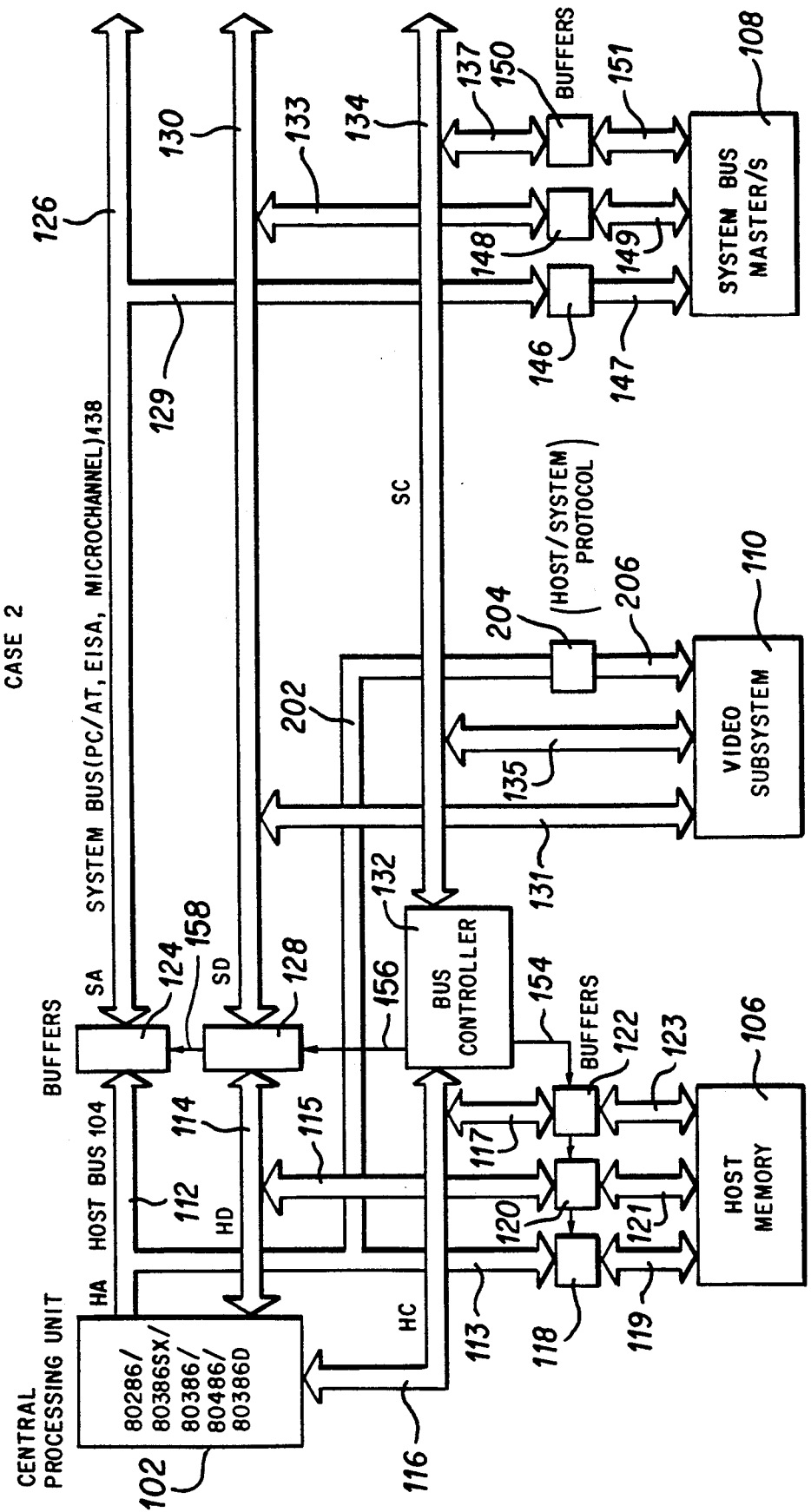
FIG. 2 is a high level block diagram of a further example (case 2) of a conventional architecture in a PC system.

FIG. 2 illustrates a further example of a conventional architecture in a personal computer system. The architecture illustrates another manner in which the video subsystem 110 can be interfaced to the PC system. This architecture is used when an embedded video subsystem 110 is desired. The video subsystem 110 is embedded on the system mother board (not shown).

The SC bus 134 and the SD bus 130 communicate with the video subsystem 110 in the conventional manner as indicated in FIG. 1. However, the HA bus 112 directly communicates with the video subsystem 110 via bus 113, bus 202, buffer 204, and bus 206.

The communication between the CPU 102 and the video subsystem 110 via the HD bus 114 is in accordance with a host/system protocol, which is very similar to the system bus protocol. However, the addresses to the video subsystem 110 are transmitted faster because the host bus 104 is faster than the system bus 138. Hence, higher performance is achieved between the CPU 102 and the video subsystem 110.

The system bus master 108 communicates with the video subsystem 110 via the same host/system protocol. Although the architecture of FIG. 2 provides for higher performance than the architecture of FIG. 1, the configuration still has a performance loss as a result of the system bus bottleneck for the data signals and control signals on, respectively, system data bus 130 and system control bus 134.

B. Architecture of the Present Invention

Figure 3:
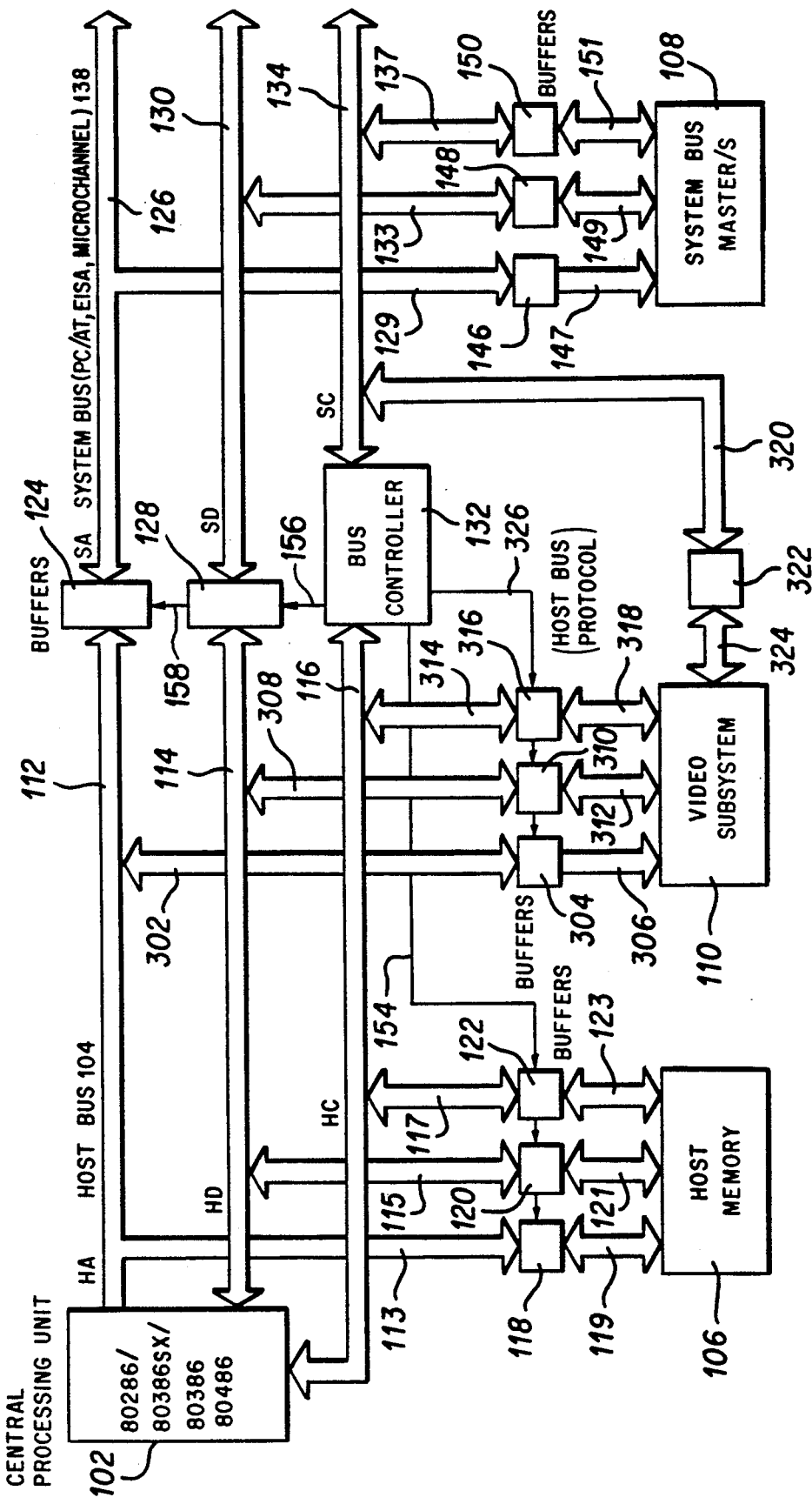
FIG. 3 illustrates the preferred embodiment of the present invention.

FIG. 3 illustrates the preferred embodiment of the present invention. The video subsystem 110 is interfaced to the host bus 104 by way of a novel host bus protocol.

When the CPU 102 communicates with the video subsystem 110, the video subsystem 110 receives host addresses from the HA bus 112 via bus 302, buffer 304, and bus 306. It receives host data from HD bus 114 via bus 308, buffer 310, and bus 312. Finally, it receives host control/status information from HC bus 116 via bus 314, buffer 316, and bus 318.

When the system bus master 108 is to communicate with the video subsystem 110, system data from the system bus master 108 is communicated to the video subsystem 110 through buffer 128. Further, system control/status signals from the system bus master 108 are communicated directly to the video subsystem 110 via bus 320, a buffer 322, and a bus 324. As a result, when the system bus master 108 interacts with the video subsystem 110, no interaction occurs with the HC bus. Similarly, when the CPU 102 interacts with the video subsystem 110, no interaction takes place via the SC bus 134.

Figure 4:
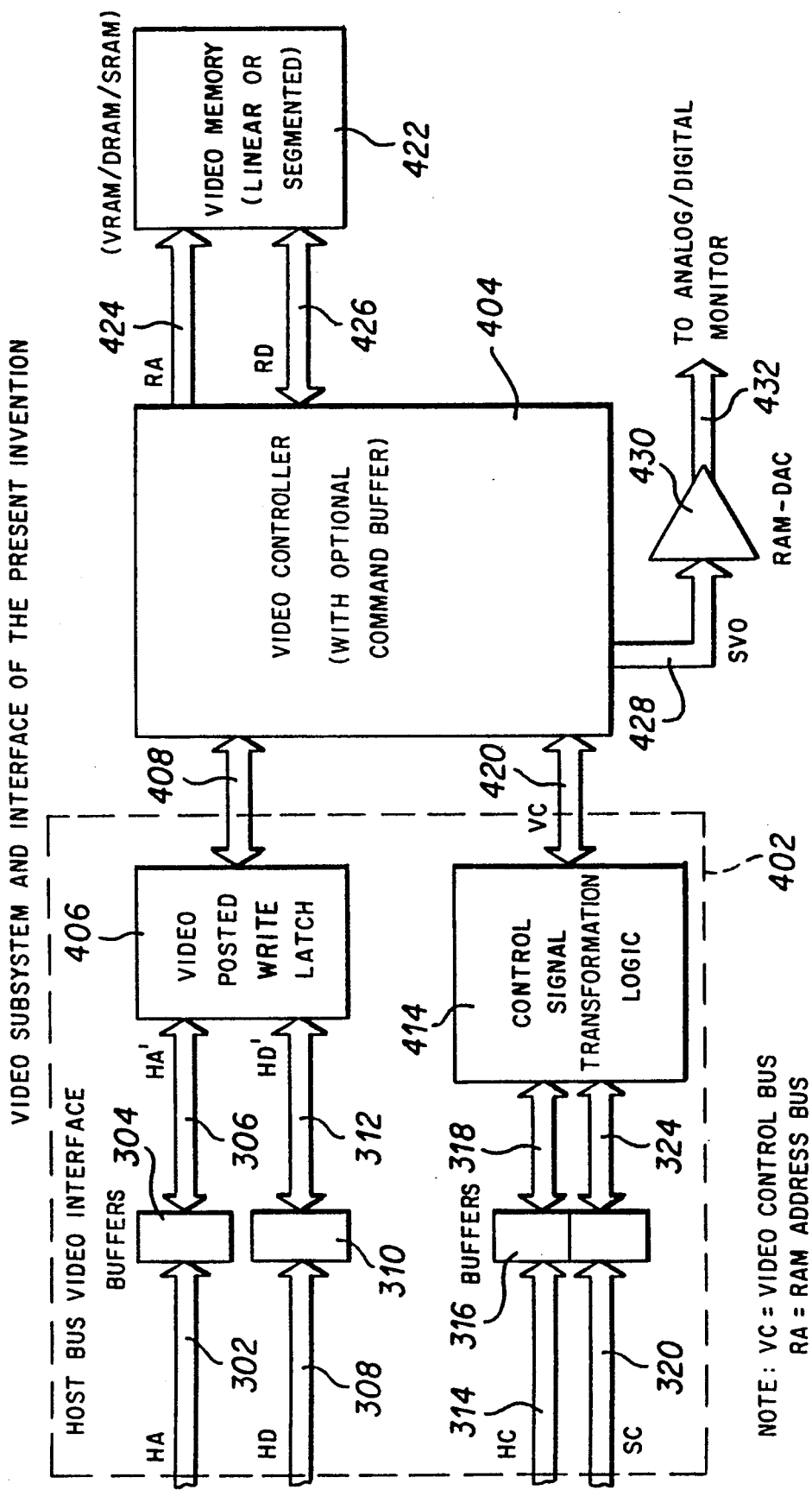
FIG. 4 shows in detail a video subsystem 110 with an interface 402 of the present invention.

FIG. 4 illustrates in detail the video subsystem 110. A host bus video interface 402 connects the video subsystem 110 to the host bus 104. The video subsystem 110 has a video controller 404.

The video controller 404 can be any of a variety, including a video controller that supports a display resolution of 640 by 480 pixels, 800 by 600 pixels, 1024 by 768 pixels, 1024 by 1024 pixels, 1280 by 1024 pixels, or any other resolution with similar driving requirements. Furthermore, it can support over 8 data bits per pixel, translating into a maximum of 256 display colors or more.

The host bus video interface 402 includes a video posted write latch 406 that allows high speed write cycles. When the CPU 102 writes at high speed to the video subsystem 110, it writes the data into the video posted write latch 406 in a relatively short time. The data is then transferred from the video posted write latch to a video controller 404 at the rate at which the video controller 404 can read the data. Accordingly, the CPU 102 is freed of the burden of having to wait until the data transfer is completed. Because the CPU 102 is capable of performing high-speed cycles on the host bus 104, a higher bus bandwidth is realized for host bus CPU cycles. Moreover, because the host bus 104 operates at higher speeds than the system bus 138, a higher video subsystem performance is realized.

With reference to FIG. 4, the video controller 404 ultimately receives host addresses from the HA bus 302 via the buffer 304, HA' bus 306, video posted write latch 406, and bus 408. Moreover, the video controller 404 ultimately receives data from the HD bus 308 via the buffer 310, HD' bus 312, video posted write latch 406, and bus 408.

Control signals enter the video subsystem 110 from both the host bus 104 and the system bus 138. Via bus 314, host control signals from HC bus 116 enter buffer 316. After the host control signals are buffered, they are input to the control signal transformation logic 414 via bus 318. Further, system control signals from SC bus 134 enter buffer 322 via bus 320. After the system control signals are buffered in buffer 322, they are input to the control signal transformation logic 414 via bus 324.

Video control (VC) signals are transmitted from the control signal transformation logic 414 via bus 420 to the video controller 404. Generally, the VC signals are video control/status signals, such as video memory read (VMEMR), video memory write (VMEMW), video I/O read (VIOR), video I/O write (VIOW), and video subsystem ready (VRDY*). For purposes of this discussion, an asterisk "*" following the name of a signal indicates that the signal is active low.

The video controller 404 interfaces to a video memory 422 via a RAM address (RA) bus 424 and a RAM data (RD) bus 426. The video memory 422 could be segmented or linear. Moreover, the video memory 422 can comprise VRAM, DRAM, or SRAM in the preferred embodiment.

For driving a video display monitor (not shown), serial data is output by the video controller 404 on serial video output (SVO) bus 428 to a registered digital-to-analog converter (RAM-DAC) 430. The RAM-DAC 430 drives an analog color monitor (not shown) via bus 432.

II. Hardware Protocol

A. Conventional Hardware Protocol

Figure 5:
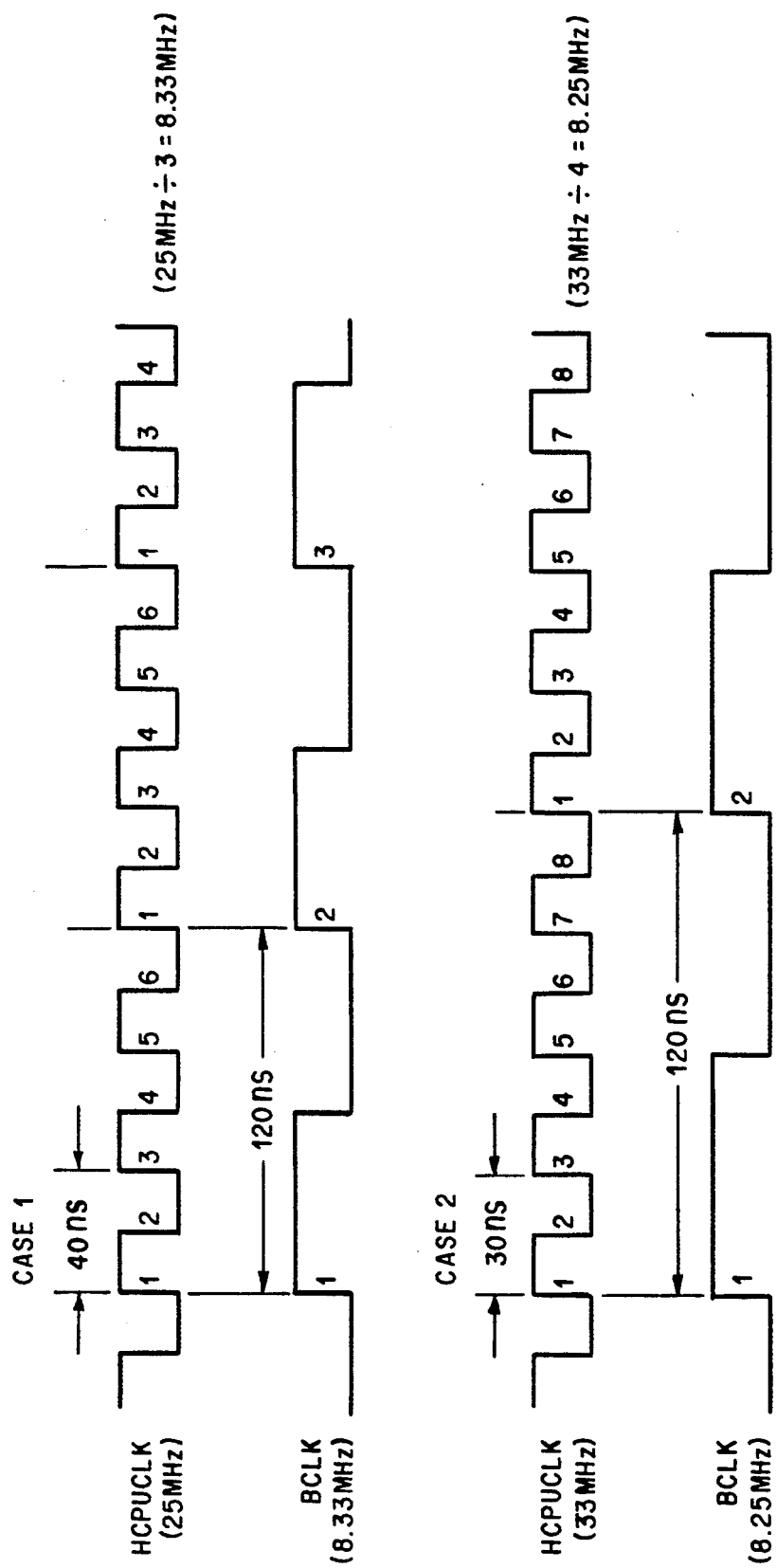
FIG. 5 is a graphical representation of the CPU clock to system clock relationship for the conventional architectures of cases I and 2.

The conventional PC architectures illustrated in FIG. 1 (case 1) and FIG. 2 (case 2) utilize the hardware protocol of the system bus 138. FIG. 5 graphically shows the CPU clock to system clock relationship of cases 1 and 2.

For case 1, three CPU clocks at 25 Megahertz (MHz) equal one system bus clock at 8.33 MHz. With reference to the clock relationship of case 1 shown in FIG. 5, the following relationships exist: (1) 1 system bus cycle (read or write)=6 BCLKs=18 HCPUCLKs at 25 MHz, and (2) Wait States=18−2=16 for 16 bits of data at 25 MHz.

For case 2, four CPU clocks at 33 MHz equal one system bus clock at 8.25 MHz. With reference to the clock relationship of case 2 illustrated in FIG. 5, the following relationships exist: (1) 1 system bus cycle (read or write)=6 BCLKs=24 HCPUCLKs at 33 MHz, and (2) Wait States=24−2=22 for 16 bits of data at 33 MHz.

In cases 1 and 2, the I/0 cycles to the video subsystem 110 are similar in timing to the host memory protocol. However, an I/O access is only 8 data bits wide. Accordingly, the effective performance of the I/O cycles is less than half of the host memory cycles.

Figure 6:
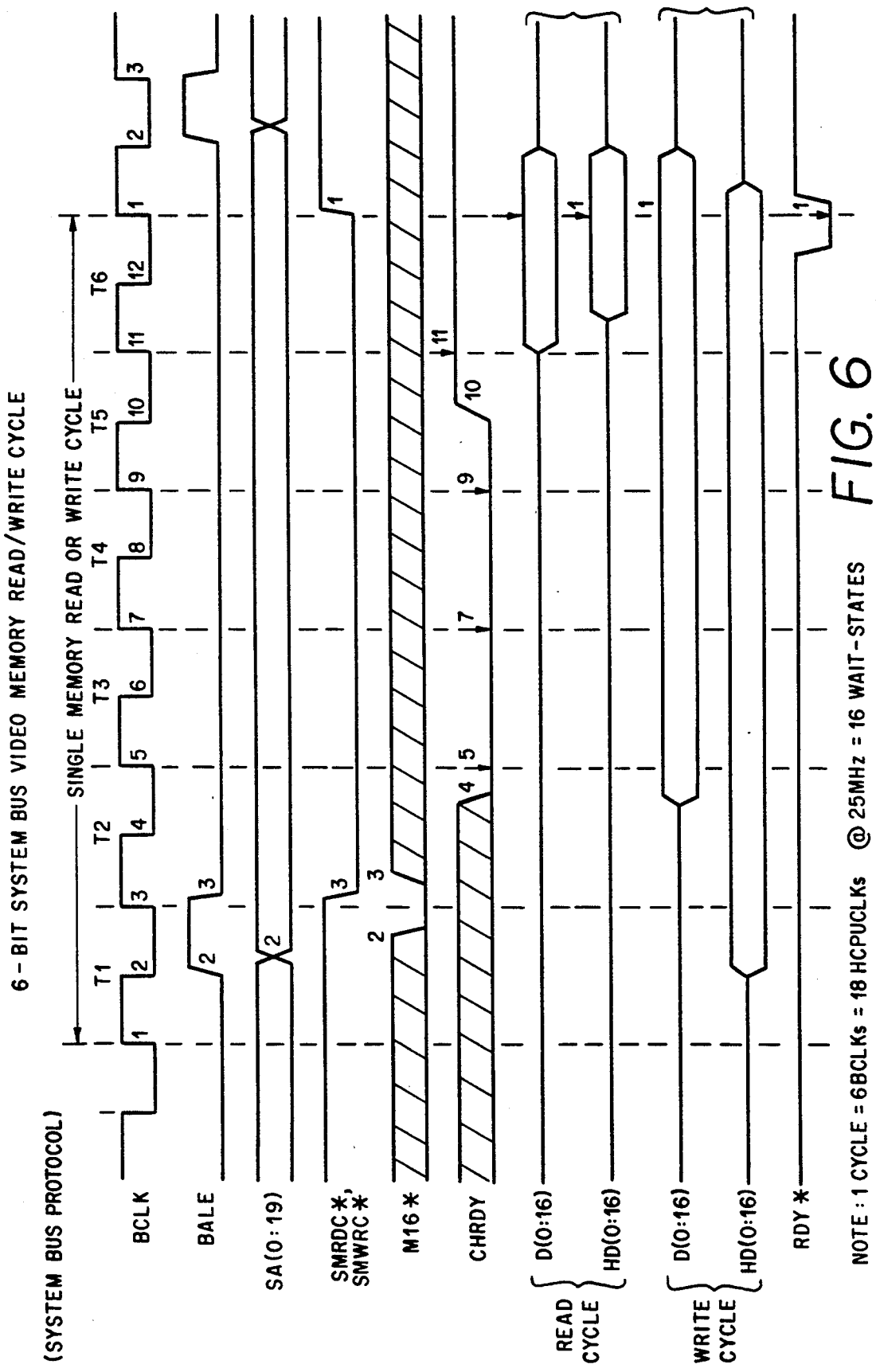
FIG. 6 illustrates a hardware protocol for a read or write cycle of a 16-bit video memory utilizing the conventional architecture of either case I or case 2.

FIG. 6 illustrates a hardware protocol for a 16-bit video memory read or write cycle utilizing the conventional architecture of case 1 or case 2. A system bus clock (BCLK) is shown with six relevant states, T1-T6. Relevant to the discussion that follows are the rising and falling edges of the BCLK, which are labelled 1-12 and will be referred to below as instances 1-12.

When the CPU 102 of case 1 or 2 wishes to interact with the video subsystem 110, a memory cycle on the system bus protocol is initiated by the bus controller 132. The bus controller 132 asserts a signal called buffer address latch enable (BALE) onto SC bus 134 at instance 2. The BALE signal reaches the video subsystem 110 via bus 135, buffer 144, and bus 145. The signal BALE is negated at instance 3.

The SA bus 126 is also activated at instance 2. In response, the video subsystem 110 asserts memory size 16 (M16*) to the bus controller 132 via bus 145, buffer 144, and bus 135. The M16* signal indicates that a 16-bit data memory cycle is to occur. This signal is active low at instance 2. Moreover, the M16* signal is negated at instance 3.

The bus controller 132 after receiving the M16* signal asserts either a host memory read command (SMRC) or a host memory write command (SMWC) to the video subsystem 110 via SC bus 134, bus 135, buffer 144, and bus 145. Both the SMRC and the SMWC signals are active low. The selection of either SMRC or SMWC depends on whether, respectively, a read cycle or a write cycle will occur at instance 3. This memory read or write command signal is negated at instance 1 of the next memory cycle.

For a read cycle, after the control signal SMRC is asserted by the bus controller 132 to the video subsystem 110, data is placed on lines 0:15 (0 to 15, inclusive) of the SD bus 130 via bus 143, buffer 142, and bus 131. On the SD bus 130, the data then passes through buffer 128 to either lines 0:15 or lines 16:31 of the HD bus 114. The CPU 102 reads this data from the HD bus 114 at instance 1, as indicated in FIG. 6.

For a write cycle, data is output by the CPU 102 on either lines 0:15 or lines 16:31 of the HD bus 114. This data is passed onto the SD bus 130, more specifically, on lines 0:15, via buffer 128. Subsequently, the data is read by the video subsystem 110 through bus 131, buffer 142, and bus 143.

To terminate the ongoing write cycle, a channel ready (CHRDY*) signal is sent from the video subsystem 110 to the bus controller 132 at instance 10. The CHRDY* signal continues active until instance 4 of a subsequent cycle. The CHRDY* signal is transformed into a ready (RDY*) signal at the bus controller 132. The termination of the ongoing write cycle is achieved when the RDY* signal is asserted briefly by the bus controller 132 to the CPU 102 around instance 1 of the subsequent cycle. Accordingly, the CPU 102 terminates the current write cycle and initiates the subsequent cycle.

From analysis of FIG. 6, the following relationships are apparent with regard to a 16-bit video memory cycle: (1) 1 cycle=6 BCLKs=18 HCPUCLKs at 25 MHz, (2) Wait States=18−2=16 for 16 bits of data at 25 MHz, (3) 1 cycle=6 BLCKs=24 HCPUCLKs at 33 MHz, and (4) Wait States=24−2=22 for 16 bits of data at 33 MHz.

Figure 7:
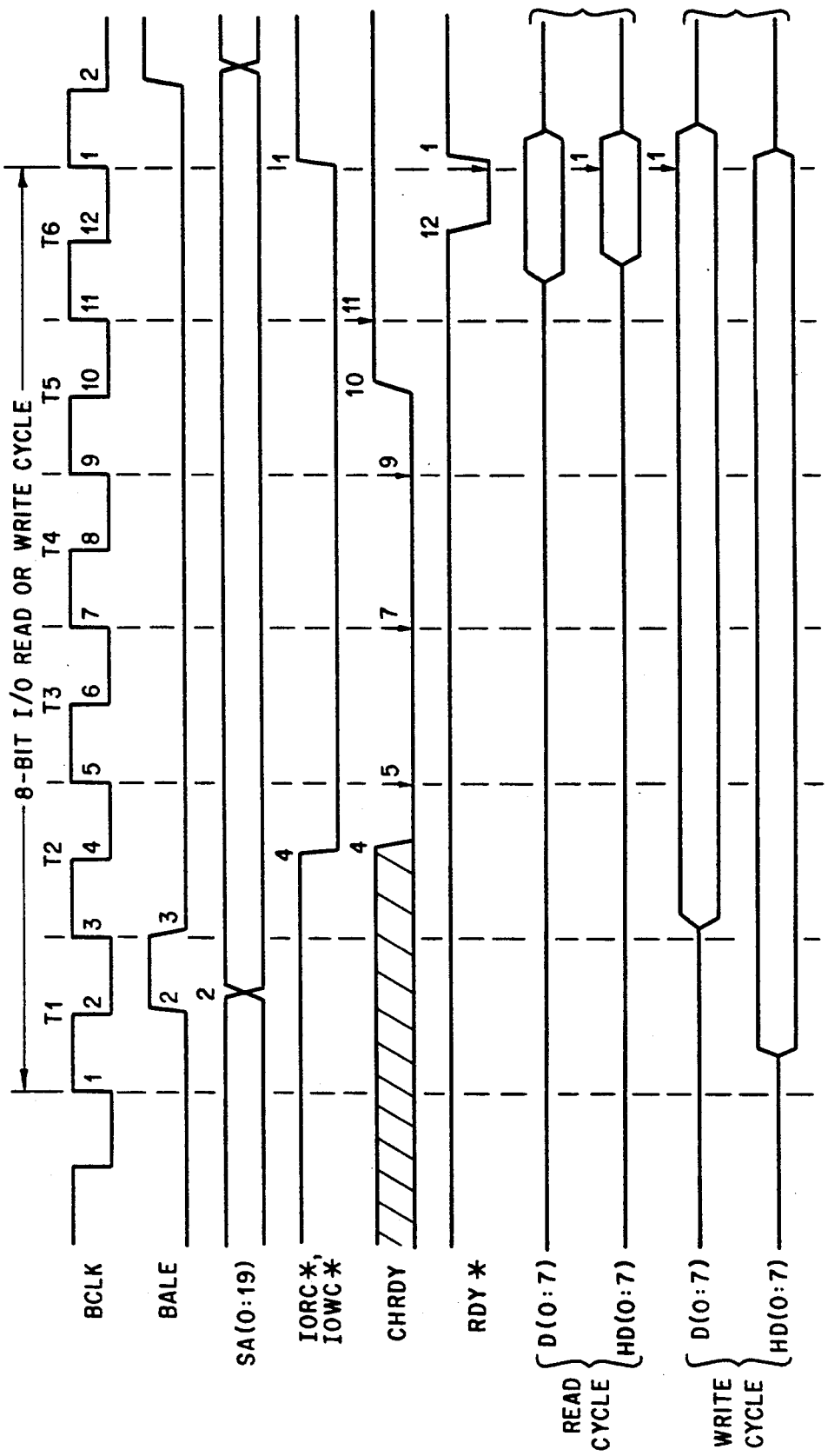
FIG. 7 shows a conventional system bus protocol for a read/write cycle when the video subsystem 110 is communicating with an 8-bit input/output (I/0) device.

FIG. 7 illustrates a conventional system bus protocol for a read/write cycle when the video subsystem 110 is communicating with an 8-bit I/O device (not shown) situated on the system bus 138. The I/O cycles to the video subsystem 110 are similar in timing to the CPU cycles of the video subsystem 110. However, they differ in that different control signals (IORC* for read or IOWR* for write) are communicated to the I/O device by the bus controller 132 and different control signals (VIORC* for read or VIOWC* for write) are communicated between the bus controller 132 and the video subsystem 110. Moreover, the data bus size is only 8 bits wide, as opposed to 16 bits wide. Hence, the effective performance of the conventional architectures using the protocol of FIG. 7 are less than half that of the host memory cycles.

From analysis of FIG. 7, the following relationships are apparent with regard to an 8-bit I/O cycle: (1) 1 cycle=6 BCLKs=18 HCPUCLKs at 25 MHz, (2) Wait States=18−2=16 for 8 bits of data at 25 MHz, (3) Wait States=(2*16)+3=35 for 16 bits of data at 25 MHz, (4) 1 cycle=6 BLCKs=24 HCPUCLKs at 33 MHz, (5) Wait States=24−2=22 for 8 bits of data at 33 MHz, and (6) Wait States=(22*2)+4=48 for 16 bits of data at 33 MHz.

B. Hardware Protocol of the Present Invention

Figure 8:
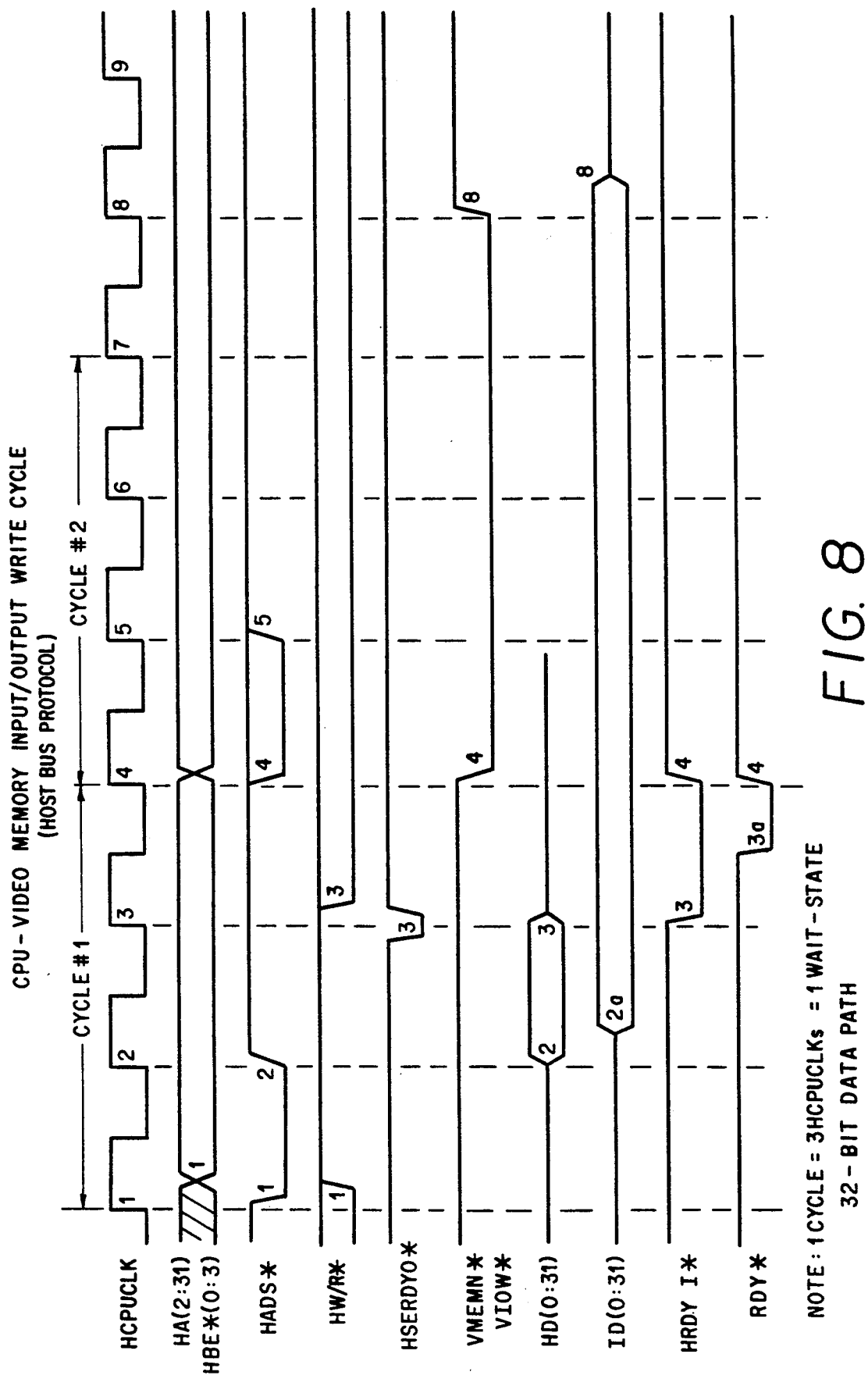
FIG. 8 shows the write cycle protocol for the host bus 104 of the present invention.

The discussion pertaining to the hardware protocol of the present invention will make reference to FIGS. 3, 4, 8, and 9. FIG. 8 shows the write cycle protocol for the host bus 104 of the present invention. The write cycle protocol illustrated in FIG. 8 provides for interactions between the video subsystem 110 and CPU 102 as well as between the video subsystem 110 and I/O devices.

Recall that during a write cycle, the CPU 102 writes to the video posted write latch 406 of the video controller 404. The video posted write latch 406 is a very fast temporary storage buffer. It can retrieve data from the CPU 102 sooner than the video controller 404 itself. The video posted write latch 406 provides for zero wait state access during single write accesses, which has not been accomplished in conventional designs. Hence, the CPU 102 is permitted to perform high-performance cycles.

As shown in FIG. 8, a cycle requires three CPU (HCPUCLK) clock cycles. At instance 1, a host address (HA 2:31, HBE 0:3) is asserted by the CPU 102 onto the HA bus 112. At the same time, a write/read (HW/R) control signal and a host address strobe (HADS*) are asserted by the CPU 102 on HC bus 116. These actions by the CPU 102 initiate the host bus protocol.

If the host address on HA bus 112 is in the appropriate video memory or video I/O range, the video subsystem 110 becomes active. For a write cycle from the CPU 102 to the video subsystem 110, the CPU 102 puts data (32 bits or greater) onto the HD bus 114 at instance 2. The video subsystem 110 responds by asserting a control signal on HC bus 116. The control signal is called a host shared early ready output signal (HSERDYO*). This signal is sampled by the CPU 102. The CPU cycle is terminated either at instance 3 in the case of a zero wait state access or at instance 4 in the case of a one wait state access. FIG. 8 illustrates a one wait state access cycle.

The current write cycle is terminated when a ready signal (RDY*) is received by the CPU 102 from the video subsystem 110 on HC bus 116. The data is latched by the interface 402 into the video posted write latch 406 of the video controller 404 at instance 3. This data is available to the video controller 404 upon its request. The interface 402 provides either a video memory write signal (VMEMW*) or a video I/O write signal (VIOW*) to the video controller 404 via VC bus 420 during instance 4 until instance 8. The latched data in the video posted write latch 406 is registered by the video controller 404 at instance 8.

Without waiting for the completion of video cycle 1, the CPU 102 executes the next cycle, cycle 2, at instance 4. This early execution of cycle 2 provides a higher performance bandwidth to the CPU 102. The conventional techniques as illustrated in FIGS. 6 and 7 use up to 16 wait states at 25 megahertz to perform the same cycle with only 16 bits of data. Conventional techniques use up the wait state by default, because the system bus 138 is designed to handle slower peripherals.

Figure 9:
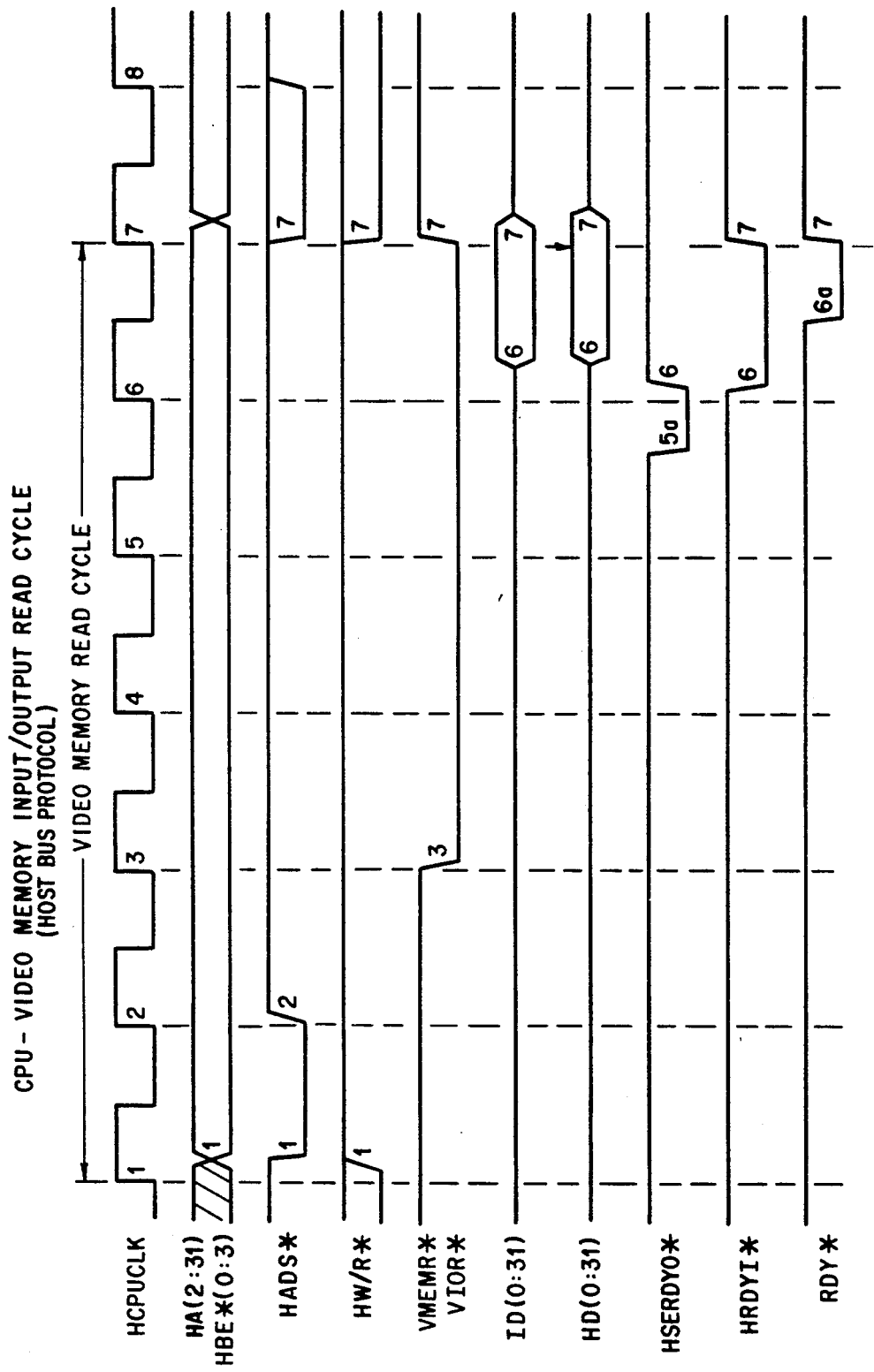
FIG. 9 illustrates the read cycle protocol of the host bus video interface 402 of the present invention.

FIG. 9 illustrates the read cycle protocol to the host bus video interface 402 of the present invention. A video memory read cycle takes six CPU (HCPUCLK) cycles. The read cycle starts at instance 1 with the host address being initiated by the CPU 102 on HA bus 112 along with the appropriate write/read control signal on HC bus 116. An address strobe (HADS*) is also asserted by the CPU 102 on HC bus 116 at instance 1. Either a video memory signal (VMEMR*) or a I/O read signal (VIOR*) is asserted at instance 3 by the interface 402. This signal is negated at instance 7.

Data from the video controller 404 is available on the internal HD' bus 312 at instance 6. Data is available until just after instance 7 as indicated in FIG. 9. This data is passed onto lines 0:31 of the HD bus 114 via buffer 310 and bus 308. The CPU 102 latches in the data at instance 7 from HD bus 114. The read cycle is terminated when the CPU 102 samples the RDY* signal asserted by the interface 402 at instance 7.

The video subsystem 110 of the present invention can be operated by a software program code oriented for 32 data bits in accordance with the above protocol. Conventional program code is usually written either for 8 or 16 data bits. The widening of the data code path from 8 or 16 bits to 32 bits gives the video subsystem 110 of the present invention a two-fold performance boost over conventional interfaces.

III. Conclusion

The present invention provides for a significant improvement in performance over conventional architectures. With reference to FIG. 9, the video read cycle of the present invention only requires a total of four CPU wait states at 25 MHz. In contrast, the video read cycle of the conventional architectures of cases 1 and 2, where the video subsystem 110 is interfaced to an 8-bit or 16-bit system bus 138, requires 16 CPU wait states at 25 MHz. If the CPU 102 were operated at 33 MHz, the performance improvement would be much greater. Hence, the video host bus interface 402 by enabling the video subsystem 110 to communicate directly to the host bus 104 provides for a higher performance during read and write cycles than if the video subsystem 110 were interfaced to the system bus 138.

A further performance improvement is provided by the present invention. This improvement is applicable to a CPU 102 which can read/write in 32-bit increments, such as an Intel 80386, 80386D, or 80486. The interface 402 efficiently converts a 32-bit cycle into two back-to-back 16-bit cycles. If the video subsystem 110 were interfaced to the system bus 138, 24 CPU wait states would be needed for conversion of the 32 data bits into 16 data bits. In contrast with the present invention where the video subsystem 110 is interfaced to the host bus 104, a host bus cycle uses only eight CPU wait states for a read cycle and only five CPU wait states for a write cycle during a 32-to-16-bit data conversion.

Still a further improvement to the conventional art implemented by the present invention is a video memory interface on the video controller 404 for providing the means of communicating to static random access memory (SRAM). The interface allows the use of high-speed SRAMs that do not require memory-related overhead performance hits, such as row and column address precharge as well as refresh. As a result, SRAMs having faster access times allow for a video controller 404 with an even higher performance.

It is very obvious that as the operating clock speed of the CPU 102 is increased, interfacing the video subsystem 110 to the host bus 104 provides an even greater performance increase over interfacing the video subsystem 110 to the system bus 138. When interfacing the video subsystem 110 to the system bus 138, the performance is constant and is independent of the CPU clock speed.

Finally, with respect to the software controlling the host bus video interface 402 of the present invention, the widening of the data code path from 8 or 16 bits to 32 bits gives the video subsystem 110 a two-fold performance boost over conventional video interfaces.

It should be understood that present invention is not limited to its preferred embodiments, and that the examples presented above are merely for the purposes of illustration. The scope of the present invention should therefore be interpreted by the following claims as defined by the foregoing figures and text.

We claim the following:

1. A computer apparatus comprising:
   (1) a CPU;
   (2) a host bus connected to the CPU and the host bus having a host address bus, a host data bus, and a host control bus;
   (3) a system bus connected to the host bus, the system bus comprising a system address bus connected to the host address bus by a first buffer, the system bus comprising a system data bus connected to the host control bus by a bus controller;
   (4) a video subsystem having a video controller and a video memory; and
   (5) a host bus video interface connecting the host bus to the video subsystem, the host bus video interface comprising a third buffer connecting the host address bus to the video subsystem and the third buffer is controlled by the bus controller, the host bus video interface comprising a fourth buffer connecting the host data bus to the video subsystem and the fourth buffer is controlled by the bus controller, the host bus video interface comprising a fifth buffer connecting the host control bus to the video subsystem and the fifth buffer is controlled by the bus controller, and the host bus video interface comprising a sixth buffer connecting the system control bus to said video subsystem.

2. The system of claim 1, wherein said host bus video interface comprises a video posted write latch, said video posted write latch adapted to receive data from said host data bus though said fourth buffer.

3. The system of claim 1, wherein the host video interface includes a temporary storage buffer means for retrieving data from the host data bus via the fourth buffer and for transferring the data to the video controller in a FIFO manner.

4. The computer apparatus of claim 1, wherein the host bus video interface further comprises:
- a latch, coupled between the third buffer and the video subsystem and further coupled between the fourth buffer and the video subsystem, configured to receive data from the CPU via the third and fourth buffers at a data rate comparable to that of the CPU and to transfer the received data to video subsystem at a rate at which the video subsystem can read the data; and
- control logic, coupled between the fifth buffer and the video subsystem and further coupled between the sixth buffer and the video subsystem, configured to send a signal to the CPU terminating the write cycle during which the data was written to the latch.

* * * * *